(12) United States Patent
Xiangqian et al.

(10) Patent No.: US 8,077,324 B2
(45) Date of Patent: Dec. 13, 2011

(54) SURFACE CHARACTERISTIC DETERMINING APPARATUS

(75) Inventors: Jiang Xiangqian, Huddersfield (GB); Kaiwei Wang, Huddersfield (GB); Haydn Martin, Huddersfield (GB); Shuming Yang, Huddersfield (GB)

(73) Assignee: University of Huddersfield of Queensgate, Huddersfield (GB)

( * ) Notice: Subject to any disclaimer, the term of this patent is extended or adjusted under 35 U.S.C. 154(b) by 39 days.

(21) Appl. No.: 12/304,930

(22) PCT Filed: Jun. 14, 2007

(86) PCT No.: PCT/GB2007/002249
§ 371 (c)(1),
(2), (4) Date: Feb. 11, 2009

(87) PCT Pub. No.: WO2007/144654
PCT Pub. Date: Dec. 21, 2007

(65) Prior Publication Data
US 2009/0207416 A1 Aug. 20, 2009

(30) Foreign Application Priority Data

Jun. 14, 2006 (GB) .................................. 0611807.9

(51) Int. Cl.
*G01B 9/02* (2006.01)
(52) U.S. Cl. ........................................ 356/511; 356/521

(58) Field of Classification Search .................. 356/479, 356/497, 511–516, 495
See application file for complete search history.

(56) References Cited

U.S. PATENT DOCUMENTS
5,694,216 A 12/1997 Riza
2005/0083534 A1 4/2005 Riza et al.

FOREIGN PATENT DOCUMENTS
WO WO 92/19930 11/1992

OTHER PUBLICATIONS
International Search Report dated Nov. 7, 2007, International Application No. PCT/GB2007/002249, filed Jun. 14, 2007.

*Primary Examiner* — Hwa Lee
(74) *Attorney, Agent, or Firm* — Alston & Bird LLP

(57) ABSTRACT

Light from the first and second different wavelength light sources is combined and supplied to a director that directs zeroth order light to a reference surface and other order, generally first order diffracted light to on a location of the sample surface which is dependent upon wavelength. Light reflected by the sample and reference surfaces interfere. A characteristic of a sample surface is determined from interference light of the first wavelength. Interference light of the second wavelength is used to enable phase-locking by adjusting the path length difference by moving the reference surface or changing the refractive index of a path portion to compensate for phase variation due to environmental effects. Non-mechanical scanning is used to scan the sample surface by using a variable wavelength source and a director providing different first order diffraction angles for different wavelengths or an acousto-optical device that provides a variable pitch acoustic diffraction grating.

25 Claims, 6 Drawing Sheets

SURFACE CHARACTERISTIC DETERMINING APPARATUS

Determination of surface characteristics such as height, form, waviness, and roughness is important in many areas of technology, not least for quality control and analysis in micro-scale and nano-scale manufacturing processes. The techniques used to measure surface characteristics divide into contact techniques such as the use of a transducer to determine the displacement of a pivotally or axially movable stylus as the stylus follows a surface to be characterised during relative movement between the stylus and the surface and non-contact techniques such as optical techniques, examples being interferometric techniques such as phase-shifting interferometry in which, as discussed in Chapter 14 of the second edition of "Optical Shop Testing" by Daniel Malacara (ISBN 0-471-52232-5), a series of interferograms are recorded as the reference phase of the interferometer is changed and a phase extraction algorithm is then used to determine the actual phase (which is related to the relative surface height), or white light or broadband scanning interferometry in which advantage is taken of the fact that the amplitude of the interference fringes produced with a spatially incoherent light source peaks at the position along the scan path of zero path difference between the sample surface and the reference surface and then falls off rapidly, so allowing a surface height profile to be determined by determining the position along the scan path of the coherence peak for different surface elements or surface pixels of the sample surface.

An aspect of the present invention provides an interferometric surface characteristic determining apparatus that enables phase-locking to compensate for environmental effects and that allows for non-mechanical scanning to enable surface characteristics of different surface locations to be determined.

In an aspect of the present invention, light from the first and second different wavelength light sources is combined and supplied to a director that directs zeroth order light to a reference surface and other order, generally first order diffracted light to a location of the sample surface which is dependent upon wavelength. Light reflected by the sample and reference surfaces interfere. A characteristic of a sample surface is determined from interference light of the first wavelength. Interference light of the second wavelength is used to enable phase-locking by adjusting the path length difference by moving the reference surface or changing the refractive index of a path portion to compensate for phase variation due to environmental effects. Non-mechanical scanning is used to scan the sample surface by using a variable wavelength source and a director providing different first order diffraction angles for different wavelengths or an acousto-optical device that provides a variable pitch acoustic diffraction grating.

An aspect of the present invention provides surface characteristic determining apparatus for determining a characteristic of a sample surface, the apparatus comprising:
a first light source to provide light of one of a plurality of first wavelengths;
a second light source to provide light of a second wavelength;
a combiner to combine light from the first and second light sources to produce combined light;
a director to diffract the combined light to cause one order of diffracted light to be directed be incident on a location of the sample surface dependent upon wavelength and zeroth order light to be incident on a reference surface such that light reflected by the sample surface and light reflected by the reference surface interfere to provide interference light,
a first detector to detect interference light of the first wavelength;
a second detector to detect interference light of the second wavelength;
a path controller to control the relative locations of the reference and sample surface on the basis of interference light detected by the second detector to compensate for phase variation due to environmental effects;
a determiner to determine a characteristic of a sample surface on the basis of interference light detected by the first detector; and
a light source controller to change the wavelength of the first light source to change the location of the sample surface on which light from the first light source is incident to enable the surface characteristic to be determined for different sample surface locations.

Preferably, the director comprises a phase grating, although it could be an amplitude grating. In an embodiment, the path controller comprises a piezo-electric controller which may move the reference surface.

An aspect of the present invention provides surface characteristic determining apparatus for determining a characteristic of a sample surface, the apparatus comprising:
a first light source to provide light of one of a plurality of first wavelengths;
a second light source to provide light of a second wavelength;
a combiner to combine light from the first and second light sources to produce combined light;
a director to direct combined light along a reference path towards a reference surface and along a measurement path towards a sample surface such that light reflected by the sample surface and light reflected by the reference surface interfere to provide interference light,
a first detector to detect interference light of the first wavelength;
a second detector to detect interference light of the second wavelength;
an electro-optic modulator to control the relative lengths of the reference and measurement paths on the basis of interference light detected by the second detector to compensate for phase variation due to environmental effects;
a determiner to determine a characteristic of a sample surface on the basis of interference light detected by the first detector; and
a light source controller to change the wavelength of the first light source to change the location of the sample surface on which light from the first light source is incident to enable the surface characteristic to be determined for different sample surface locations.

A further aspect of the present invention provides surface characteristic determining apparatus for determining a characteristic of a sample surface, the apparatus comprising:
a first light source to provide light of a first wavelength;
a director to direct light along a reference path towards a reference surface and along a measurement path towards a sample surface such that light reflected by the sample surface and light reflected by the reference surface interfere to provide interference light,
a first detector to detect interference light of the first wavelength;
a determiner to determine a characteristic of a sample surface on the basis of interference light detected by the first detector; and
wherein the measurement path includes an acousto-optical element to control the location of the sample surface on which light from the first light source is incident to enable the surface characteristic to be determined for different sample surface locations.

In an embodiment of this further aspect, the apparatus also comprises:

a second light source to provide light of a second wavelength;
a combiner to combine light from the first and second light sources to produce combined light to cause the director to direct combined light along the reference and sample paths
a second detector to detect interference light of the second wavelength; and
a path length controller to control the relative lengths of the reference and measurement paths on the basis of interference light detected by the second detector.

The reference surface may be a mirror but could be a Bragg grating, for example a fibre Bragg grating.

In an embodiment, the acoustic optical element is configured to provide an acoustic diffraction grating having a controllable pitch to diffract light on the measurement path to a location of the sample surface determined by the pitch of the acoustic diffraction grating.

In an embodiment, the acoustic optical element is configured to provide an acoustic diffraction grating having a pitch controlled by a frequency of an applied signal, the acoustic diffraction grating being arranged to diffract light on the measurement path to an location of the sample surface determined by the pitch of the acoustic diffraction grating.

The director may comprise an optical coupler. The combiner may comprise an optical coupler.

In an embodiment, at least one optical circulator is provided to supply combined light from the combiner towards the director and to supply interference light to the first and second detectors.

In an embodiment, at least one of the first and second detectors is provided with a filter, for example a Bragg grating such as a fibre Bragg grating, to enable only light of the first or second wavelength to be incident on that detector.

In an embodiment, first and second optical circulators are provided to supply combined light towards the director and to supply interference light to the first and second detectors, the first optical circulator having first port to receive combined light, a second port to supply combined light to the director and a third port to supply interference light to a first port of the second optical circulator, the second optical circulator having second port to supply interference light to one of the first and second detectors via a reflector that reflects light of one of the first and second wavelengths and a third port to supply light reflected by the reflector to the other of the first and second detectors. The reflector comprises a Bragg grating such as a fibre Bragg grating.

The director may be provided as an optical probe separable from other optical components of the apparatus. The director may be coupled to the other optical components by an optical fibre coupling enabling remote location of the optical probe. An optical switch such as a fibre switch may be provided to enable a plurality of optical probes to be coupled to the apparatus.

In an embodiment, the optical system apart from the optical probe is provided as a single integrated device. The optical probe may be as a single integrated device. In an example, integration is achieved using silica-on-silicon technology.

In an embodiment, the apparatus is configured as two interferometers having the first and second light sources, respectively and sharing at least parts of their measurement and reference paths. The two interferometers may comprise fibre interferometers. The two interferometers may comprise Michelson interferometers.

In an embodiment, the determiner is operable to use phase shifting interferometer to determine a characteristic of a sample surface on the basis of interference light detected by the first detector at a plurality of different phase positions.

Aspects of the present invention include methods of using the apparatus.

As used herein "light" does not necessarily mean visible light. The light may be infra red or ultra violet light, for example. As used herein "beam" does not necessarily mean a continuous beam, it could be pulsed or otherwise vary in amplitude.

Embodiments of the present invention will now be described, by way of example, with reference to the accompanying drawings, in which.

With reference to the drawings in general, it should be understood that any functional block diagrams are intended simply to show the functionality that exists within the device and should not be taken to imply that each block shown in the functional block diagram is necessarily a discrete or separate entity. The functionality provided by a block may be discrete or may be dispersed throughout the device or throughout a part of the device. In addition, the functionality may incorporate, where appropriate, hard-wired elements, software elements or firmware elements or any combination of these.

Figure 1:
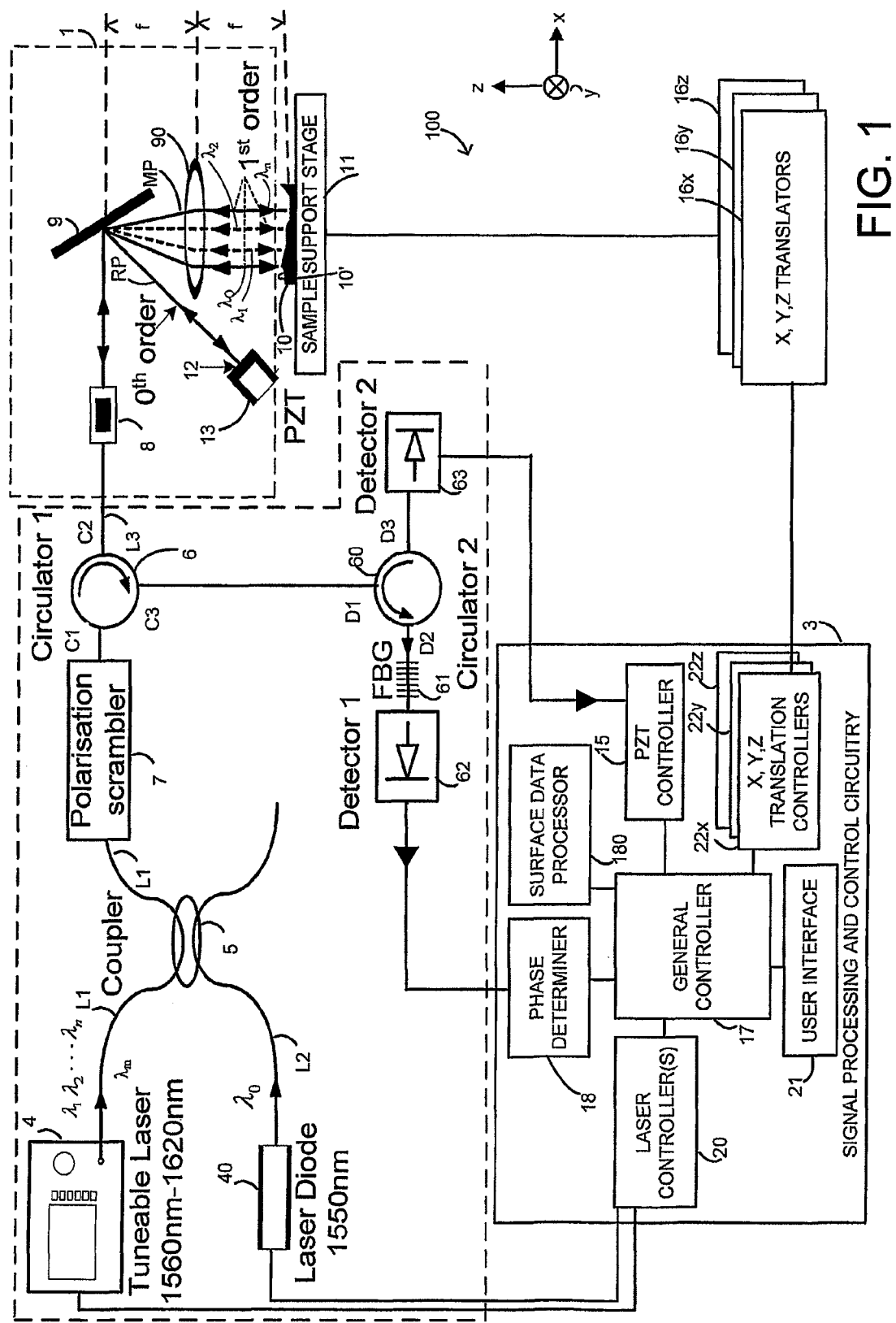
FIG. 1 shows a functional diagram of one example of a surface characteristic determining apparatus comprising a fibre interferometer apparatus, embodying the present invention.

Referring now specifically to FIG. 1, there is shown a functional diagram of one example of a surface characteristic determining apparatus 100 comprising a Michelson fibre interferometer.

The surface characteristic determining apparatus 100 comprises an optical probe 1 or measurement head, an optical system 2 and signal processing and control circuitry 3.

The optical system 2 has a tuneable laser 4 which provides a tuneable wavelength measurement beam tuneable from $\lambda_1$, $\lambda_2$ to $\lambda_n$ (as shown tuned at a wavelength $\lambda_m$) to an optical fibre path L1 and a reference laser diode 40 which provides a reference beam of a single wavelength $\lambda_0$ to an optical fibre path L2. Typically, the tuneable laser 4 may be tuneable from a wavelength of 1560 nm (nanometres) to a wavelength of 1620 nm while the reference laser diode 40 may provide a reference beam of wavelength 1550 nm (nanometres)

The optical fibre path L2 is coupled by an optical coupler 5 which may be a 2×2 channel optical coupler, for example a 3 dB optical coupler, to the optical fibre path L1 to combine the light beams from the tuneable laser 4 and the single wavelength laser diode 40. The optical fibre path L1 is coupled to a first port C1 of a first three port optical circulator 6 having its second port C2 coupled to an optical fibre path L3 to supply the combined beam to the optical probe 1. The circulator may be a Thorlabs 6015-3-FC circulator or similar device. The circulator 6 acts to circulate light from port to port in the direction shown (that is from C1 to C2 and from C2 to C3, but can not from C2 back to C1) and prevents light returning to the tuneable laser 4 and laser diode 40. The optical fibre paths in this example and the following examples are provided by single-mode optical fibre.

A polarization scrambler 7, for example an all-fibre polarization scrambler, may be provided between the coupler 5 and the circulator 6 to modulate the polarization state of the light in order to address possible polarization fading problems that can occur with fibre interferometers.

The measurement head or optical probe 1 comprises a collimator in the form of a graded refractive index lens (GRIN) 8 to collimate light from the optical fibre path L3 onto a dispersive element in the form of a phase grating 9 from which different diffractive orders are diffracted at different angles with the actual angle of diffraction of all but the zeroth order being wavelength dependent.

The phase grating 9 is located so that the diffraction point on the phase grating is in the rear focal plane of an objective lens 90 of focal length f of the optical probe. The objective lens 90 has an acceptance angle sufficient to accept the first order diffracted light beam from the phase grating 9 throughout the wavelength range of the tuneable laser 4 through which the wavelength is intended to be swept or scanned during operation, which wavelength range may be a portion of or the entire range of the tuneable laser.

A sample 10 is mounted on a sample support stage 11 so that the mean surface 10a of the sample surface 10' lies in the focal plane of the objective lens 90, thereby providing a confocal system. The sample surface 10' is such that light from the objective lens is incident normally of the mean sample surface and is retro-reflected by the sample surface. By way of example, FIG. 1 shows diagrammatically the location of incidence on the sample surface 10' of the reference beam (wavelength $\lambda_0$) and various different possible wavelengths $\lambda_1$ to $\lambda_n$ to which the tuneable laser 4 may be tuned.

A reference mirror 12 is positioned so as to receive the zeroth order diffracted beam from the phase grating 9.

The third port C3 of the circulator 6 is coupled to a first port D1 of a second circulator 60 having its second port D2 coupled via a Fibre Bragg Grating (FBG) 61 which passes the measurement beam wavelength $\lambda_m$ from the tuneable laser to a first optical detector 62 and reflects the reference beam wavelength $\lambda_0$ back to its third port D3 which is coupled to a second optical detector 63. The optical detectors may be, for example, PIN photodiodes or other appropriate photosensitive semiconductor devices.

The reference mirror 12 is mounted on a piezoelectric element 13 which is controlled by a PZT servo controller 15 of the signal processing and control circuitry 3. The PZT servo controller 15 is coupled to receive the output signal of the second optical detector 63 to enable the position of the reference mirror 12 to be adjusted in accordance with the output of the second optical detector 63.

The sample support stage 11 may be movable by X, Y and Z axis translators 16x, 16y and 16z to enable leveling of the sample surface and positioning of the sample support at the focus of the objective lens. At least one of the X and Y translators may be used to enable a surface height profile across a measurement path of the surface to be obtained.

The PZT controller 15 is also configured to cause, under the control of the signal processing and control circuitry 3, phase stepping of the reference mirror to allow, as will be discussed below, a phase shifting interferometric process to be carried out to extract the actual phase.

As shown in FIG. 1, the signal processing and control circuitry 3 has a general controller 17 to control overall operation of the signal processing and control circuitry 3, a phase determiner 18 to determine a phase (and thus surface height) from a number of phase stepping measurements using a known phase extraction algorithm, a laser controller or controllers 20 to control operation of the lasers, for example to control wavelength tuning of the tuneable laser 4, and a user interface 21 to enable a user to interface with the apparatus to control its operation and to view the results of its operation.

The signal processing and control circuitry 3 may have a surface data processor 180 to process data determined by the phase determiner 18 along a measurement path or paths across the sample surface to enable a 2D surface profile or 3D surface height map to be produced.

Where the X, Y and Z axis translators 16x, 16y and 16z are provided, then the signal processing and control circuitry 3 will also have corresponding X, Y and Z axis translation controllers 22x, 22y and 22z which may be open-loop or closed-loop servo controllers.

The surface characteristic determining apparatus 100 shown in FIG. 1 thus provides two Michelson fibre interferometers that, for the main, share a common optical path. The first or measurement fibre interferometer includes the tuneable laser 4. The second or reference Michelson fibre interferometer includes the reference laser diode 40 and acts, by virtue of the adjustment of the reference mirror in accordance with the output signal of the second optical detector 63, to phase-lock the output of the tuneable laser 4 to compensate for variations in phase/path length due to environmental effects such as temperature changes, air currents or turbulence, mechanical vibration and so on. The reference Michelson fibre interferometer thus acts to monitor and control the surface characterization apparatus to enable high accuracy to be achieved even in the presence of adverse environmental perturbations.

The optical dispersive probe 1 may, by virtue of the optical fibre coupling, be located remotely from the remainder of the apparatus which may have advantages where access to the surface to be measured is restricted or difficult.

In operation of the surface characteristic determining apparatus 100, light from the laser diode 40 is coupled with light from the tuneable laser 4 and is supplied via the optical circulator 5 (and polarization scrambler 7 if present) and the optical fibre path L3 to the optical probe where the light is then collimated by the graded-index lens 8 (GRIN). The collimated light passes to the phase grating 9 in the optical probe 2. The first order diffracted beam provides the measurement beam on the measurement path MP and is focused onto the surface 10' to be measured from whence it is retro-reflected. The zeroth order beam provides the reference beam on the reference path RP and is reflected by the reference mirror 12. Light reflected along the measurement path MP and the reference path RP interfere at the phase grating 9 and the resulting interference beam is supplied via the GRIN lens 8 to the circulator 6 and exits the next (the third on the return path) port C3 of the circulator 5 and is supplied to the first port 1 of the circulator 60. The interference beam is circulated to and output from the second port D2 of the circulator 60 to the fibre Bragg grating 61 which passes all but the reference wavelength $\lambda_0$ light to the detector 62 which provides the output measurement signal. The fibre Bragg grating 61 reflects the reference wavelength light $\lambda_0$ back to the circulator 60 which outputs the reference wavelength light $\lambda_0$ to the detector 63 which provides a phase-locking output signal to the PZT controller which controls the PZT 13 in accordance with the phase-locking signal from the detector 63 to move the reference mirror 12 to compensate for phase/path length changes due environmental effects such as temperature changes, air currents or turbulence, mechanical vibration and so on as mentioned above. The PZT 13 thus provides phase-locking by control the position of the reference mirror 12 to compensate for such environmental effects. As the reference and measurement interferometers share most of the optical path except slight separation between the 1st order diffraction beams, this should eliminate most environmental noise.

The surface topography of the sample surface 10' modulates the phase of the reflected light. The output or measurement signal provided by the interferometer I(x) is $$I(x) = A(x) + B(x)\cos\left[\frac{2\pi}{\lambda(x)}(2h(x) + l)\right], \quad (1)$$

where A(x) and B(x) are the bias intensity and fringe visibility at a point x along the scan path respectively. h(x) is the height variation at the point x of the sample surface around the average optical path difference between the interferometer arms, l. If the overall optical path difference between the 2 arms, l is set to zero, the phase term φ(x) in the square bracket in Equation (1) may be simplified, thus giving $$h(x) = \frac{\varphi(x)}{4\pi}\lambda(x) \quad (2)$$

The tuneability of the tuneable laser 4 enables scanning of the sample surface 10' in the, in this example, X direction. The wavelength changes in the tuneable laser 4 induce 1st order diffraction angle changes on the phase grating 9, resulting in spatial scanning of the $1^{st}$ order diffracted beam, whist the 0th order diffraction beam remains at the same position.

The scanning range S across the sample is given as $$S = f \cdot \frac{\Delta\lambda}{d} \quad (3)$$

where f is the focal length of the objective lens, d is the pitch of the phase grating 9 and $\Delta\lambda$ is the range of the wavelength scanning.

Thus, changing or sweeping the output wavelength of the tuneable laser 4 causes the diffraction angle of the $1^{st}$ order laser beam diffracted by the phase grating 8 to change so that $1^{st}$ order laser beam is incident on a different part of the sample surface and thus the light beam scans the sample surface via the objective lens. The general controller 17 controls sweeping of the wavelength and so the point of incidence on the sample surface 10', thereby enabling measurements to be made at different points on the sample surface 10' without having to effect mechanical scanning. The general controller 17 also controls the timing at which the phase determiner 18 uses the measurement signal from the detector 62 (or at which the detector 62 is activated to make a measurement) to determine the surface characteristic. Thus, at the end of a sweep of the tuneable laser 4, the phase determiner 18 will have stored measurement signals for different wavelengths during the wavelength scan and thus for different surface locations In this example, the phase determiner 18 uses Phase Shifting Interferometry (PSI) techniques to extract the actual phase from the measurement signal output by the detector 6. Accordingly the general controller 17 causes the wavelength sweep to be repeated for a number of different phase intervals by causing the PZT controller to move the reference mirror 12 by a distance corresponding to the phase a between measurements, thus altering slightly the optical path difference of the interferometers arms, so that a set of measurement signals are obtained at different positions of the reference mirror 12 and thus different phases. Thus at the end of this phase shifting procedure, the phase determiner will have a set of phase-stepped measurements for each wavelength (and thus surface location) during the wavelength scan at which the measurement signal was stored by the phase determiner.

The phase determiner 18 may use any suitable phase extraction algorithm as discussed in, for example the aforementioned Chapter 14 of the second edition of "Optical Shop Testing" by Daniel Malacara. In an example, the phase determiner 18 implements the Carré phase extraction algorithm and accordingly the general controller 17 causes measurements to be made at 4 phase positions -3a, -a, a and 3a of the reference mirror 12 and the phase determiner 18 is configured to solve four simultaneous equations for $I_1(x), I_2(x), I_3(x)$ and $I_4(x)$ using the Carré algorithm to yield the original phase value:

$$\varphi(x) = \tan^{-1}\sqrt{\frac{(3I_2(x) - 3I_3(x) - I_1(x) + I_4(x))}{(I_1(x) - I_2(x) - I_3(x) + I_4(x))^2}} \quad (4)$$

for each wavelength (and thus surface location) during the wavelength scan at which the measurement signal was stored by the phase determiner.

The general controller 17 may control, in this example, the Y translator 16y to move the sample relative to the measurement head so that measurements can be made at a number of positions on a surface measurement path in a direction parallel to the Y axis. These measurements may then be processed by the surface data processor 19 (which may implement known phase unwrapping techniques (see for example pages 514 and 551 of the afore-mentioned book by Malacara)) to provide a surface height profile along that surface measurement path that can be displayed or printed out by the user.

Thus, phase shifting techniques such as those described above may be used to extract a phase or surface height for the corresponding surface location at each wavelength or at selected wavelengths during the wavelength scan. In this example, the Y translator if present may be controlled to enable a profile to be determined along a line parallel to the y axis and passing through that surface location. Thus, a number of parallel profiles may be obtained with mechanical scanning only in one direction (the Y direction in this example).

As mentioned above the apparatus may support the sample on a sample support stage. As another possibility, the optical probe may be carried by a gantry or like support that enables the optical probe to be suspended over or projected up towards the sample surface in such a manner that the mean sample surface is normal to the optical axis of the objective lens and lies in the focal plane of the objective lens. The optical probe gantry or support may or may not allow for X, Y and Z translation.

Figure 2:
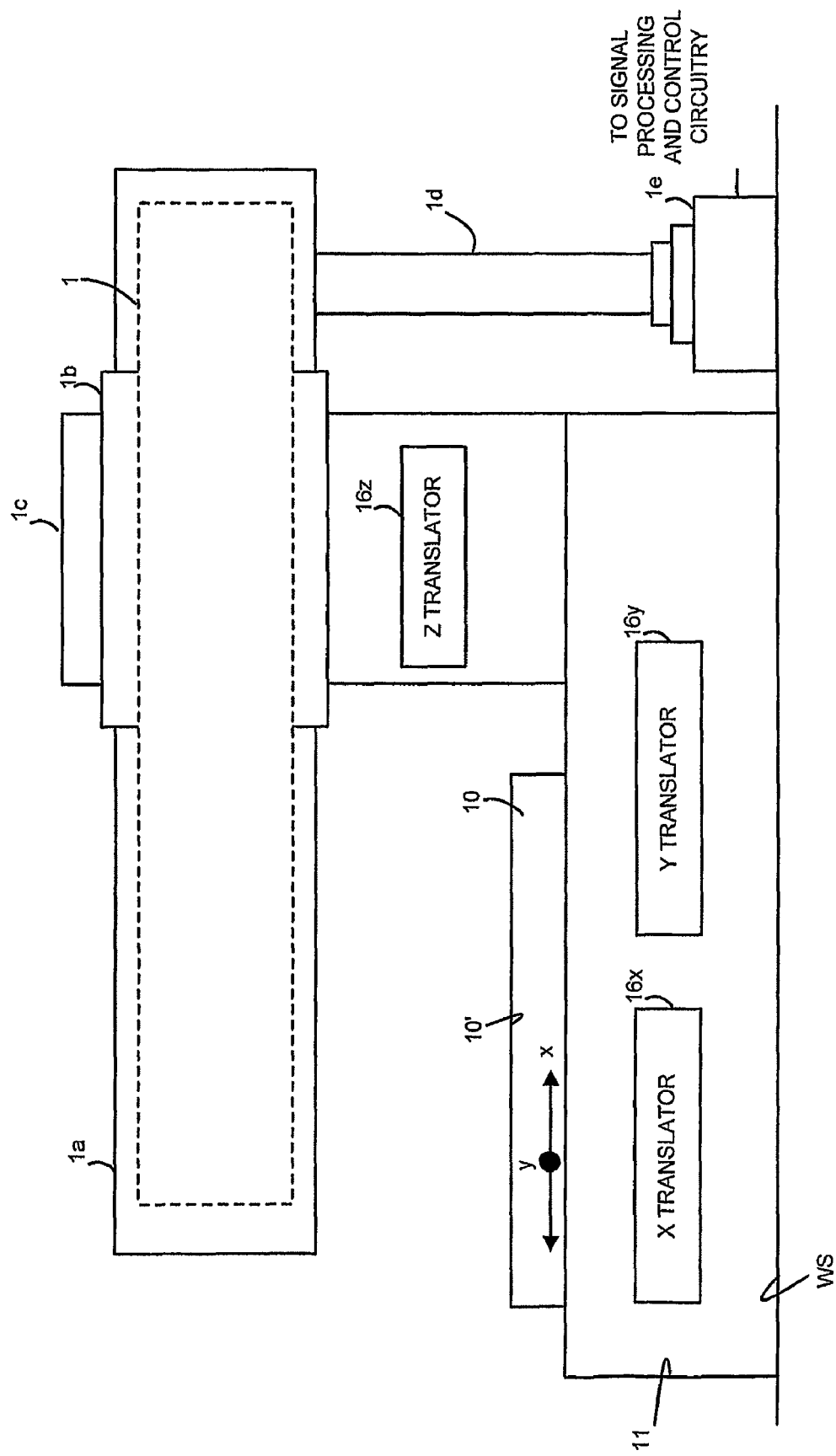
FIG. 2 shows a simplified side view of one example of a metrological instrument in the form of a surface characteristic determining apparatus comprising a fibre interferometer apparatus, embodying the present invention.

FIG. 2 shows a simplified side view of one example of a metrological instrument in which the sample is to be mounted on a sample support. As shown schematically by FIG. 2, in this example the measurement head 1 is located within a housing 1a mounted via a carriage 1b to a Z axis datum column 1c. Where the surface characteristic determining apparatus has a Z translator then the carriage 1b may coupled via a drive mechanism (not shown) such as a ball screw or lead screw drive mechanism to the Z translator 16z. The Z translator 16z may be in the form of a manually operable control or, for example, a DC motor that enables the carriage 1b and thus the measurement head 1 to be moved up and down the column 1c in the Z direction.

The optical system 2 may, by virtue of the optical fibre path (illustrated diagrammatically by Id in FIG. 2) be provided in a separate housing 1e which, as shown in FIG. 2, can be mounted on a work surface WS or may be even more remote from the measurement head 1. The signal processing and control circuitry 3 may be close by or remote from the optical system and may or may not comprise a single entity.

Where the X and Y translators 16x and 16y are present, then, as shown in FIG. 2, they may be housed in the sample support stage 11. The X and Y translators 16x and 16y may be in this example DC motors coupled to the sample support stage 11 by appropriate conventional drive mechanisms such as rack and pinion or ball screw drive mechanisms (not shown).

The signal processing and control circuitry 3 may at least partially be implemented by programming computing apparatus, for example a personal computer. Thus, some components of the signal processing and control circuitry may be provided by software, some by hardware, some by firmware and so on, depending upon the particular system requirements. Where fast processing is required then one or more DSPs may be used.

Figure 3:
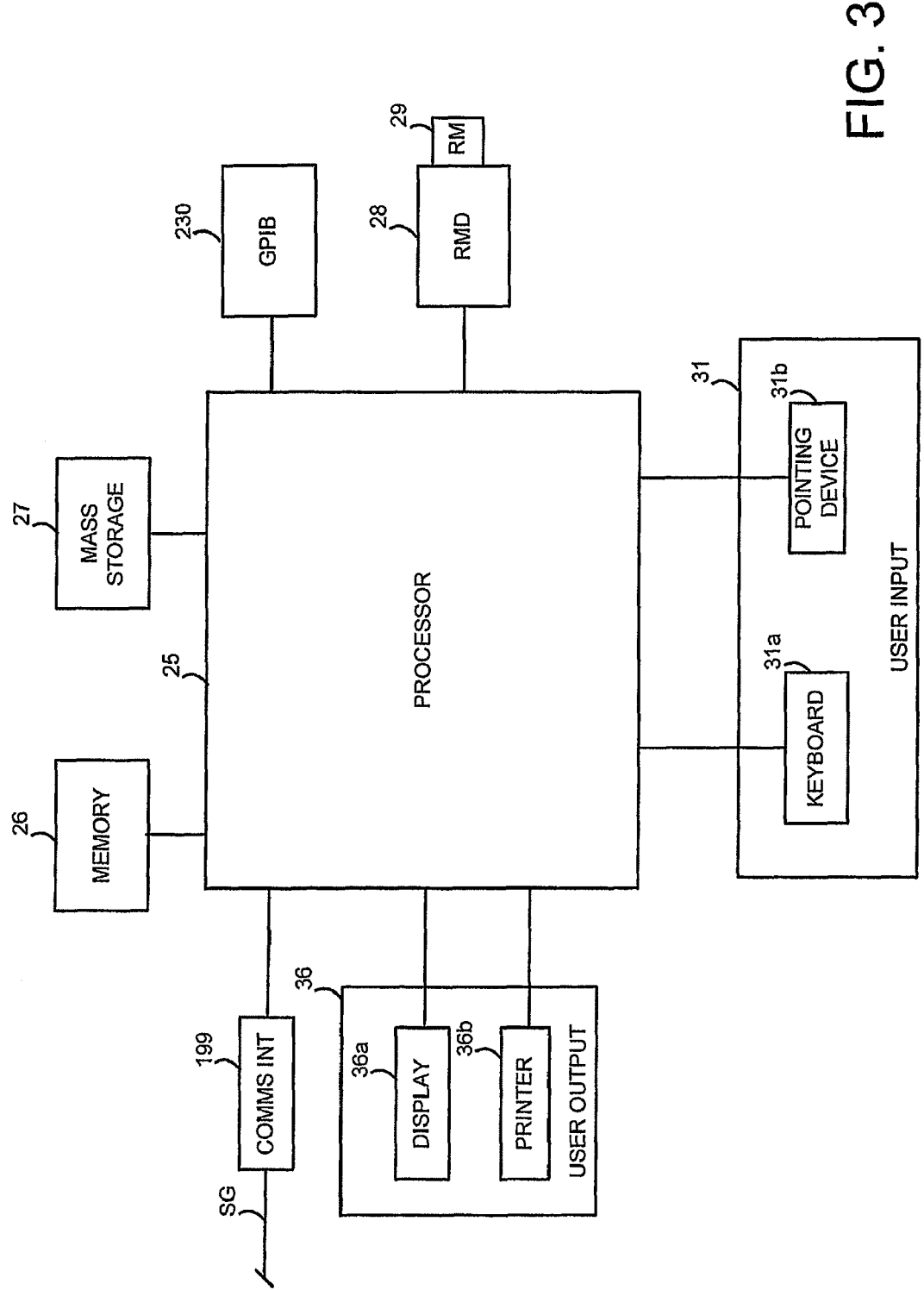
FIG. 3 shows a block diagram of processing apparatus that may be programmed by computer program instructions to provide signal processing and control circuitry of a surface characteristic determining apparatus embodying the present invention.

FIG. 3 shows a simplified block diagram of such computing apparatus. As shown, the computing apparatus has a processor 25 associated with memory 26 (ROM and/or RAM), a mass storage device 27 such as a hard disk drive, a removable medium drive (RMD) 28 for receiving a removable medium (RM) 29 such as a floppy disk, CDROM, DVD or the like, input and output (I/O) control circuitry, for example in the form of a general purpose interface bus (GPIB) card 230, for interfacing with components such as the laser controller, the PZT controller and the X, Y and Z translation controllers, if present, to enable the processor 25 to control operation of these components and to provide precise fast phase scanning and measurement.

In this example, the user interface 21 consists of a user input 31 having, in this example of a keyboard 31a and a pointing device 31b, and a user output 36 consisting, in this example, of a display such as a CRT or LCD display 36a and a printer 36b. The computing apparatus may also include a communications interface (COMMS INT) 199 such as a modem or network card that enables the computing apparatus to communicate with other computing apparatus over a network such as a local area network (LAN), wide area network (WAN), an Intranet or the Internet.

The processor 25 may be programmed to provide the control apparatus 30 shown in FIG. 3 by, for example, any one or more of the following ways:
1. by pre-installing program instructions and any associated data in a non-volatile portion of the memory 26 or on the mass storage device 27;
2. by downloading program instructions and any associated data from a removable medium 29 received within the removable medium drive 28;
3. by downloading program instructions and any associated data as a signal SG supplied from another computing apparatus via the communications interface 199; and
4. by using the user input of the user interface.

The computing apparatus, when programmed by program instructions, enables a measurement operation to be controlled in accordance with instructions received by a user via the user interface and allows the measurement results to be analyzed and the results of the analysis displayed to the user as discussed above.

Figure 4:
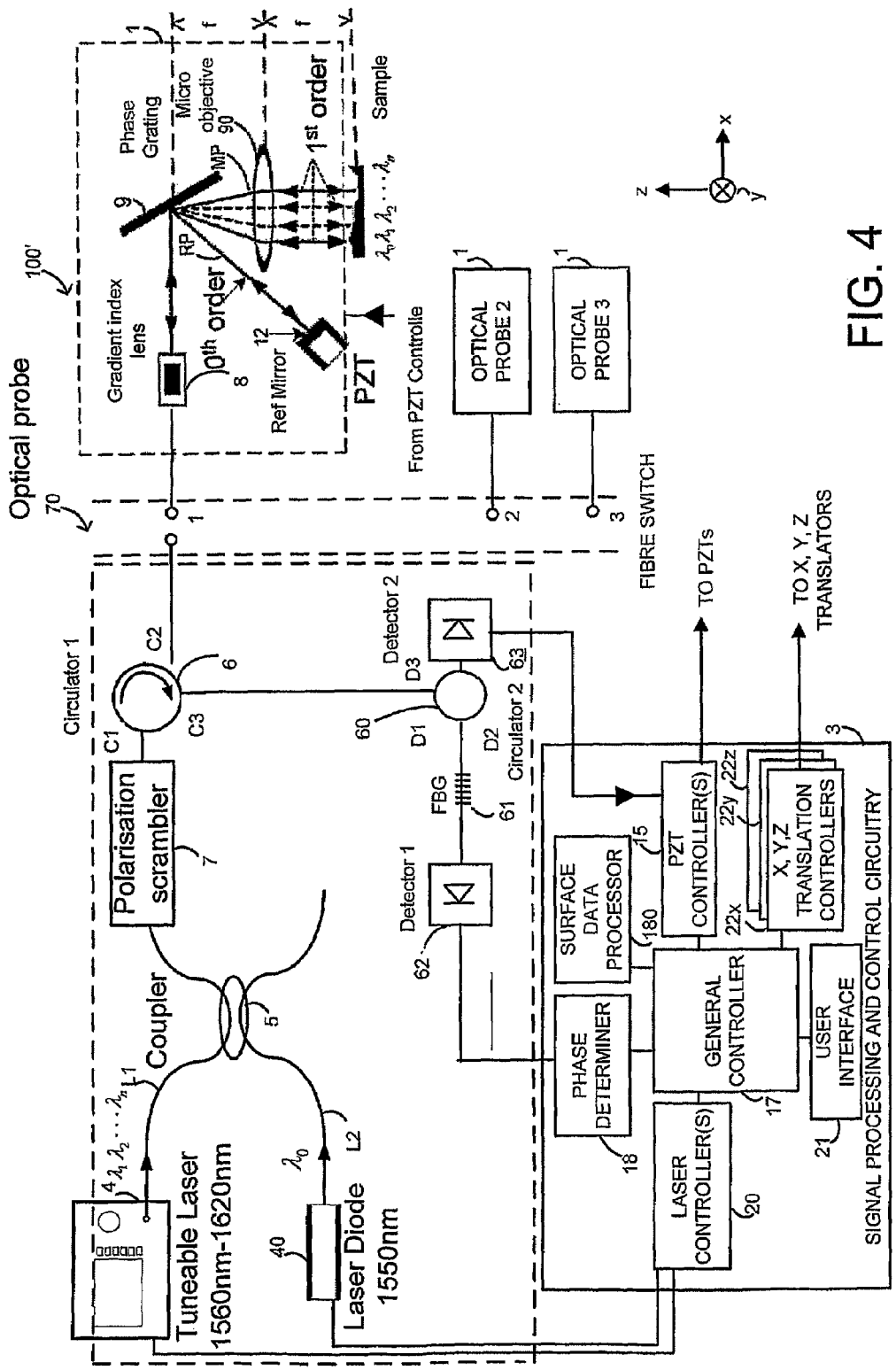
FIG. 4 shows a functional diagram of another example of a surface characteristic determining apparatus comprising a fibre interferometer apparatus, embodying the present invention.

FIG. 4 shows a functional diagram of another example of a surface characteristic determining apparatus 100' comprising a fibre interferometer apparatus which differs from that shown in FIG. 1 in that a number of measurement heads or optical probes ($1$, $1_2$ and $1_3$ as shown) are provided. All of the optical probes may be the same as the optical probe 1 shown in FIG. 1. For simplicity the structure of only the optical probe 1 is shown in FIG. 4 and in that case the sample support has omitted in the interests of clarity. Also for simplicity, although they may be present, the optical probe 1 is not shown as being associated with X, Y and Z translators. The optical probes 1, $1_2$, $1_3$ are each couplable to the same optical system 2 via a fibre switch 70 which allows fast switching, enabling measurements to be made at a number of different surface locations spaced further apart than the sweeping range provided by the tuneable laser or on a number of different surfaces of a complex component such as a segmentation lens of an extremely large optical or infrared telescope, compressor aerofoils, bio-implants such as knee prostheses and so on, one after another without having to move the measurement head or optical probe. Although not explicitly shown in FIG. 4, a multiplexing or similar system may also be provided to enable control by the signal processing and control circuitry of the PZTs 13 of each optical probe and any X, Y, Z translators associated with the optical probe.

Each optical probe can thus be connected to the optical system 2 through the fast response fibre switch 70. Such an apparatus having multiple optical probes sharing the same main optical system 2 and signal processing and control circuitry 3 forms a very flexible measurement system, that can measure many points across a large component or even different workpieces.

Figure 5:
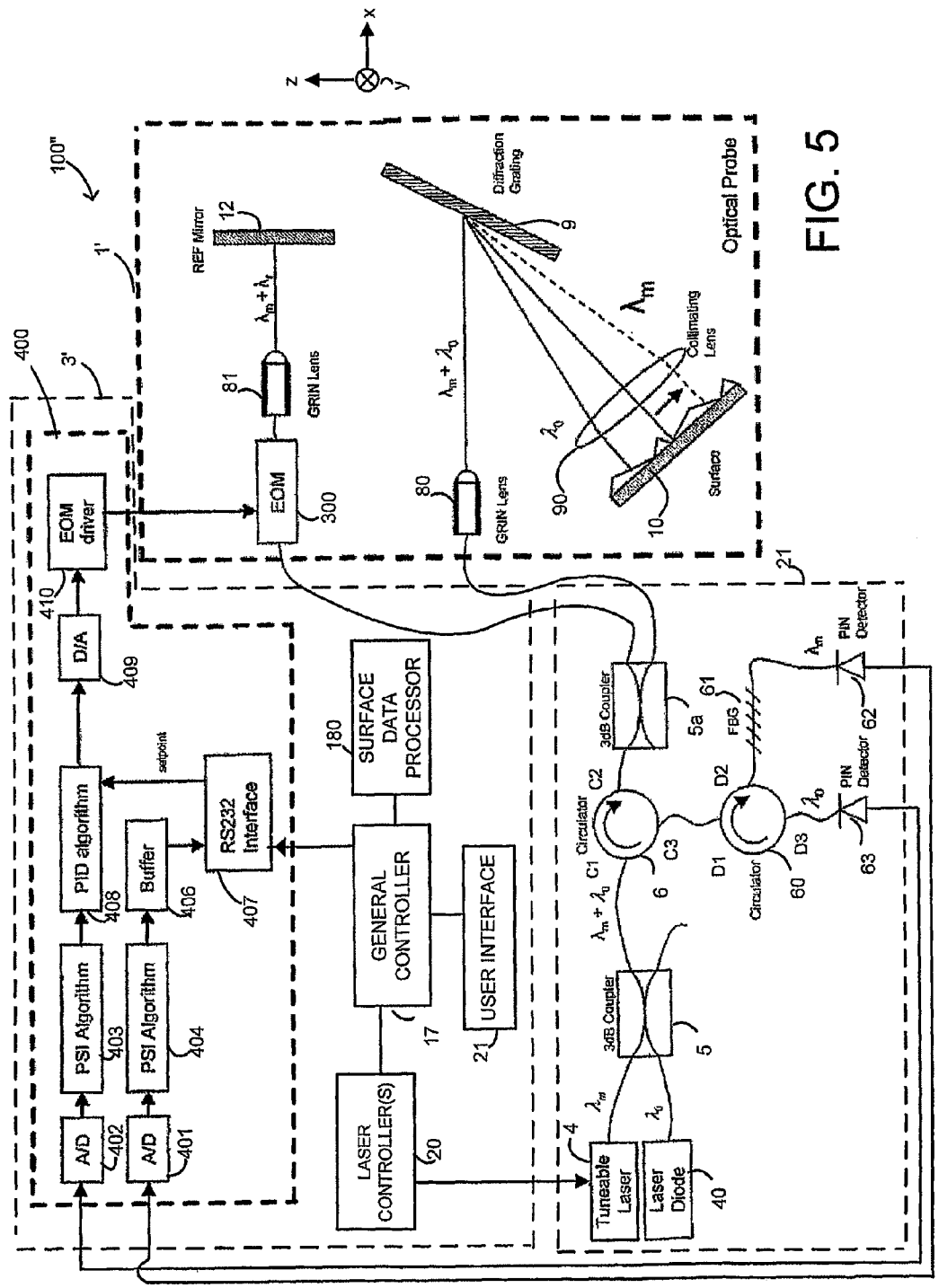
FIG. 5 shows a functional diagram of another example of a surface characteristic determining apparatus comprising a fibre interferometer apparatus, embodying the present invention.

FIG. 5 shows a functional diagram of another example of a surface characteristic determining apparatus 100" comprising a fibre interferometer apparatus that differs from the apparatus 100 shown in FIG. 1 in that a PZT is not used to control the position of the reference mirror. Rather, an electro-optic modulator (that is a device comprising a material such as lithium niobate that has a refractive index that is a function of applied voltage) is used to control the reference path length/phase both to compensate for environmental effects and to implement phase shifting to enable extraction of the actual phase as discussed above.

The apparatus 100" shown in FIG. 5 thus differs from that shown in FIG. 1 in that the PZT and its controller are omitted, the reference mirror is fixed in position, and the third port of the circulator 6 is coupled to a further optical coupler 5a (that again may be a 3 dB coupler) to enable the light from the circulator to be supplied to: 1) a first GRIN lens 80 that collimates the combined light (the reference wavelength $\lambda_o$ and the measurement wavelength $\lambda_m$) for supply to the phase grating 9; and 2) to an input of an electro-optic modulator (EOM) 300 whose output is collimated by a further GRIN lens 81 onto the reference mirror 12. The voltage applied to the EOM 300 is controlled by an EOD controller 400 of the signal processing and control circuitry 3'. The EOM 300 is capable of providing very rapid variation in its refractive index when a strong electric field is applied across it.

In the example shown, the EOD controller 300 comprises a digital signal processor (DSP) that provides both the phase detector and the PZT controller shown in FIG. 1. Otherwise the signal processing and control circuitry 3' is similar to that shown in FIG. 1 (although not shown in FIG. 5 for simplicity, if the sample is mounted on a support stage that can be moved in at least one of X, Y and Z by corresponding translators, then the signal processing and control circuitry 3' will have corresponding X, Y, Z controllers).

FIG. 5 illustrates one way in which the DSP 400 may be implemented. Thus, as shown, the output of detector 62 which represents the measurement signal is supplied to an analogue-to-digital (A/D) converter 401 while the output of detector 63 which represents the reference signal is supplied to an analogue-to-digital converter 402. The analogue-to-digital converters 401 and 402 provide digital outputs to respective PSI algorithm implementers 403 and 404 which determine the actual phase from the digital signals representing the intensity data acquired at the different phase positions during a phase shifting measurement procedure using an appropriate phase extraction algorithm as discussed above. The output from the PSI algorithm implementer 404 which represents the actual measured phase is supplied via a buffer 406 and appropriate interface 407 (as shown an RS232 interface although any appropriate computer interface may be used) to the general controller 17 of the remainder of the signal processing and control circuitry 3' for processing as described above. The analogue-to-digital converter 402, PSI algorithm implementer 404, buffer 406 and appropriate interface 407 thus provide the phase detector in this example.

The output of the PSI algorithm implementer 403 is supplied to a PID (proportional/integral/derivative) algorithm implementer 408 having a set point provided by the general controller 17 via the interface 407. The PID algorithm implementer 408 determines any difference between the required phase (determined by the set point) for the reference signal and the actual phase of the reference signal as determined by the PSI algorithm implementer 403 path and provides a digital output signal which is converted by a digital-to-analogue (D/A) converter 409 into a control signal to cause an EOM driver 410 to drive the EOM modulator 300 to change the reference path length to compensate for any phase change due to environmental effects and also to effect phase shifting to enable extraction of the actual phase as discussed above.

Thus, the EOM in the reference arm of the interferometer can be used to alter the phase in that arm, without the need for any moving parts. Because of its rapid response times, use of the EOM means that higher frequency environmental effects may be compensated for than by physically moving the reference mirror. Also, the fast access/response time opens up the possibility of using phase shift techniques at very fast rates, possibly allowing almost real-time phase readouts from the system where a DSP is used as described to carry out the analysis.

In operation of the apparatus shown in FIG. 5, phase shifting is performed applying a stepped input voltage to the EOM 300, with each step relating to the required phase shift. The DSP 400 provides the stepped driving voltage to the EOM and also synchronously samples the outputs of the detectors 62 and 63. A stepping rate of 25 μs (microseconds) can be achieved and a 4 step phase shifting algorithm should yield a real phase data stream at a rate of 10 kHz (kilo Hertz), which is much higher than the ground vibration of 200 Hz.

In so far as scanning of the surface is concerned by changing the tuned wavelength, the surface characteristic determining apparatus 100" operates in the same manner as the surface characteristic determining apparatus 100 shown in FIG. 1.

Figure 6:
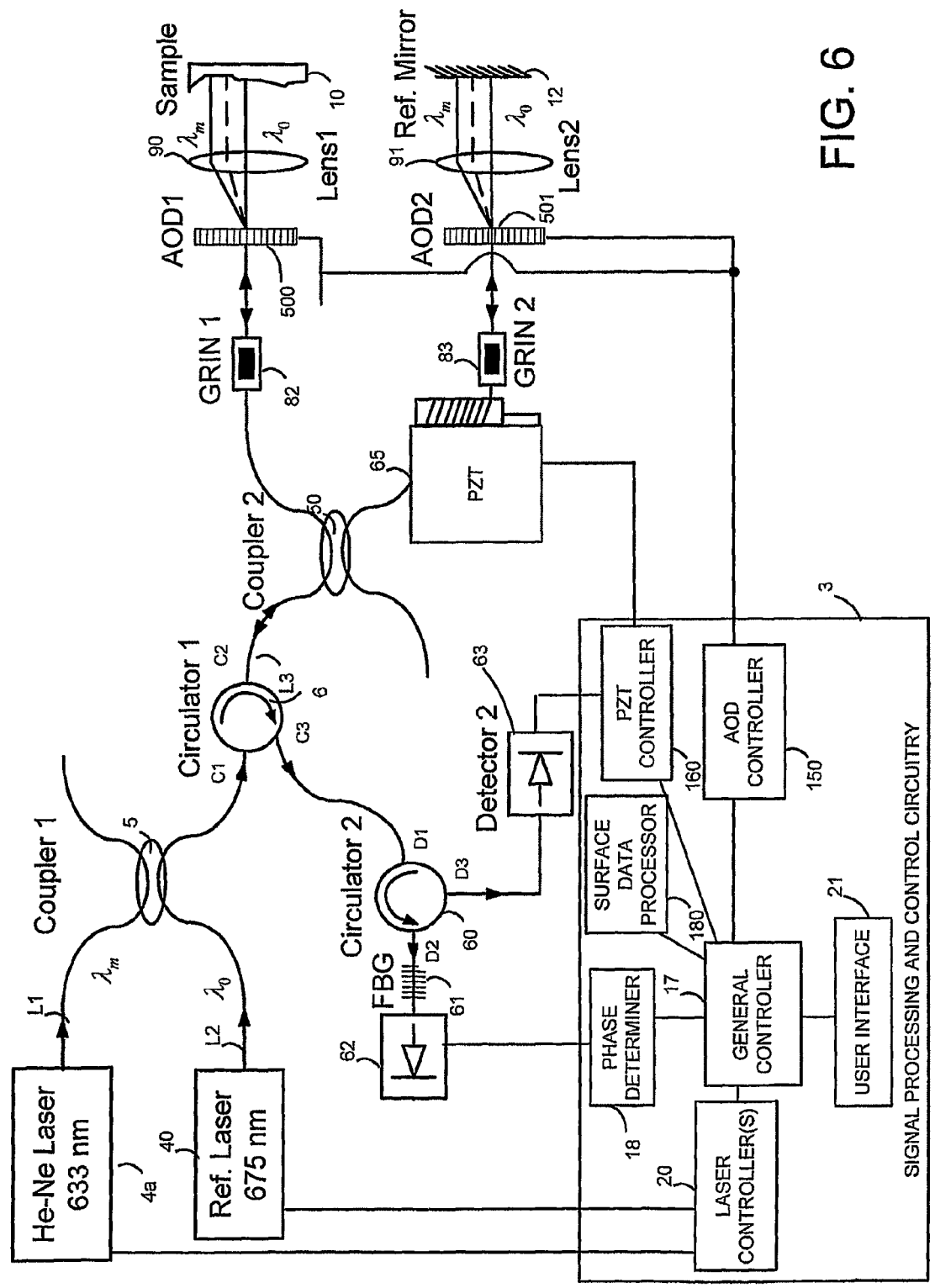
FIG. 6 shows a functional diagram of another example of a surface characteristic determining apparatus comprising a fibre interferometer apparatus, embodying the present invention.

FIG. 6 shows a functional diagram of another example of a surface characteristic determining apparatus comprising a fibre interferometer apparatus 100a that differs from the apparatus 100 shown in FIG. 1 in that a phase grating is not used. Rather, in FIG. 6 scanning is controlled by an acousto-optical deflector (AOD) consisting of a crystal such as Tellurium Oxide bonded to a transducer to which an RF signal is applied to cause sound waves to propagate across the crystal from the transducer to a sound wave absorber. This generates an acoustic diffraction grating having a pitch dependent on the frequency of the sound wave so that the angle of the first order diffraction beam produced when light is incident on the acoustic grating at the Bragg angle can be controlled by controlling the acoustic frequency.

In the apparatus 100a shown in FIG. 6, the tuneable laser is replaced by a fixed wavelength laser 4a. As shown in FIG. 6 the laser 4a is a He—Ne 633 nm laser and the reference laser diode 40 has a wavelength of 675 nm. In this example, the reference mirror 12 is fixed, and the third port of the circulator 6 is coupled to a further optical coupler 50 (that again may be a 3 dB coupler) to enable the light from the circulator to be supplied to a first GRIN lens 82 and also, via a PZT fibre phase modulator 65, to a second GRIN lens 83.

The first GRIN lens 82 acts to collimate the combined light (the reference wavelength $\lambda_0$ and the measurement wavelength $\lambda_m$) for supply to a first AOD 500 positioned at the rear focal plane of an objective lens 90. The sample is again positioned with its mean surface in the focal plane of the objective lens 90.

The second GRIN lens 83 acts to collimate the combined light (the reference wavelength $\lambda_0$ and the measurement wavelength $\lambda_m$) for supply to a second AOD 501 positioned at the rear focal plane of a further objective lens 91. The reference mirror 12 is positioned in the focal plane of the objective lens 91.

In this example, compensation for phase changes due to environment effects is achieved by the PZT controller 160 which is arranged to control the PZT fibre phase modulator 65 to adjust the reference path length in accordance with the output of the detector 63 which receives the reflected reference wavelength signal as explained above with reference to FIG. 1.

Light beam scanning in this example is effected by an AOD controller 150 which provides and controls the frequency of the drive signal applied on the AOD to control the acoustic diffraction grating pitch in accordance with control signals from the general controller 17. This controls the angle at which the first order diffraction beam is diffracted and so the location of incidence on the sample surface 10', thereby enabling phase shifting measurements to be made and the actual phase extracted at different locations on the sample surface by controlling the frequency applied to the AODs.

The measurement interferometer has in this example a fixed measurement wavelength of $\lambda_m$ different from the wavelength $\lambda_0$ of the reference interferometer. In operation, the measurement beam is combined with the reference beam by the coupler 5 and the combined beam is supplied by the circulator 6 and coupler 50 to the collimating GRINs 82 and 83. An active phase tracking homodyne (APTH) technique is thus adopted by incorporating the PZT fibre phase modulator into the reference arm of the interferometer to provide a servo feedback loop to maintain phase-locking, thereby compensating for environmental effects. Since both interferometers again share almost the same optical paths, most of the environmental effects on the measurement interferometer can be compensated by the reference interferometer.

The measurement arm AOD 500 allows the zero diffraction order of $\lambda_0$ and first diffraction order of $\lambda_m$ pass through simultaneously. The reference arm AOD 501 is identical to and controlled in the same manner as the measurement arm AOD 500. The reference arm AOD 501 serves to compensate for any frequency shift introduced by the measurement arm AOD 500. The symmetry of the measurement and reference optical paths in the optical probe may also decrease system errors introduced by any optical aberration of the objective lenses 90 and 91.

The angle of diffraction of the first order diffracted beam produced by the AODs 500 and 501 is linearly proportional to the acoustic frequency applied to the AODs. The point of diffraction of light beam on the AOD is positioned at the focus point of the lens to again achieve a confocal system and again light is retro-reflected by the sample surface.

The scanning range S of in this example is given by:

$$S = f \cdot \lambda_m \cdot \frac{\Delta f}{v_a} \quad (5)$$

where f is the focal length of objective lens, $v_a$ is the acoustic velocity in the AOD, and $\Delta f$ is the range of frequency scanning.

As the access time of AOD is extremely short (several tens of μs), the surface of sample can be scanned quickly.

As described so far, it is assumed that the AODs achieve scanning in one dimension. However two dimensional scanning may be achieved by using 2 axis AODs in which two AODs are provided in series so that they produce orthogonal gratings. This enables 3D surface measurement to be achieved without any mechanical scanning. Furthermore, there should be no achromatic aberration issues because only a single-wavelength is used for the measurement. Such a system is also very economic.

The surface characteristic determining apparatus shown in FIGS. 5 to 6 may be modified as described above with reference to FIG. 4 to enable use of multiple optical probes.

A surface characteristic determining apparatus using fibre interferometers may be of small size and can be manufactured relatively cheaply. Further reductions in size and possibly in costs may be achieved by the use of semiconductor processing and integration techniques. For example silica-on-silicon technology may be used to integrate the optical system 2 components in a small solid state chip (using on-chip waveguides to replace appropriate ones of the optical fibre paths) and the optical probe may be mounted on one channel of a waveguide of the chip, thereby forming a robust and very small surface measurement apparatus adapted to environments where space is extremely limited or access is difficult, for example for use in measuring micro or nano-scale structures.

Although not shown in FIGS. 5 to 7, a polarization scrambler 7 may be provided between the coupler 5 and the circulator 6 to modulate the polarization state of the light in order to address possible polarization fading problems.

In each of the examples described above, the sample may be correctly located relative to the optical probe by either mounting the sample on a sample support, where that is possible, or by suspending the probe on a support or gantry in the correct orientation and location relative to sample surface. The latter may facilitate in-situ sample surface measurements where the surface is part of a larger component or assembly, for example. The multi-probe configuration discussed with reference to FIG. 4 may be particularly advantageous for in-situ sample surface measurements where the surface is part of a larger component or assembly, for example, and measurements are required on different surface locations.

Although the above described examples used fibre interferometers or integrated chip waveguide arrangements, it may be possible to implement apparatus embodying the invention without the use of optical fibre or with use of optical fibre only in certain locations.

Filters or wavelength reflectors other than Bragg gratings may be used. Also, beam splitting devices may where appropriate be used instead of circulators. Other forms of collimator than GRIN lenses may be used. The reference mirror may be another form of reflective surface such as a Bragg grating, for example a fibre Bragg grating. Although preferably a phase grating is used in FIG. 1, other devices providing the same functionality may be used, for example an amplitude grating may be used.

The signal processing and control circuitry may be implemented in any appropriate manner using general purpose computers, DSPs, microcontrollers, GPIB and so on alone or in any appropriate combination. Control may be hardwired or software driven depending upon the circumstances and requirements.

Although generally first order diffracted light is detected, other orders could be used.

Although Michelson interferometers have been described above, other appropriate interferometers may be used.

As described above with reference to FIGS. 1, 4 and 5, the wavelength is continuously scanned and the timing of measurements is effected by controlling the activation of the detector or the storage of measurement signal data by the phase determiner. As another possibility, the wavelength scanning need not be continuous but could be on a step by step basis. In this case, it may be possible to effect the phase shifting measurements for one wavelength before proceeding to the next wavelength. Similar modifications may be possible with the example of FIG. 6, that is the control of the AODs need not be continuous but could be on a step by step basis and in that case, it may be possible to effect the phase shifting measurements for one surface location before proceeding to the next surface location.

Also, it may be possible to use other phase extraction techniques than those discussed above It is to be understood that any feature described in relation to any one example may be used alone, or in combination with other features described, and may also be used in combination with one or more features of any other of the examples, or any combination of any other of the examples. Furthermore, equivalents and modifications not described above may also be employed without departing from the scope of the invention.

The invention claimed is:

1. Surface characteristic determining apparatus for determining a characteristic of a sample surface, the apparatus comprising:
    a first light source to provide light of one of a plurality of first wavelengths;
    a second light source to provide light of a second wavelength;
    a combiner to combine light from the first and second light sources to produce combined light;
    a director to diffract the combined light to cause one order of diffracted light to be directed be incident on a location of the sample surface dependent upon wavelength and zeroth order light to be incident on a reference surface such that light reflected by the sample surface and light reflected by the reference surface interfere to provide interference light, a first detector to detect interference light of the first wavelength;

a second detector to detect interference light of the second wavelength;

a path controller to control the relative locations of the reference and sample surfaces on the basis of interference light detected by the second detector to compensate for phase variation due to environmental effects;

a determiner to determine a characteristic of a sample surface on the basis of interference light detected by the first detector; and a light source controller to change the wavelength of the first light source to change the location of the sample surface on which light from the first light source is incident to enable the surface characteristic to be determined for different sample surface locations.

2. Apparatus according to claim 1, wherein the director comprises a phase grating.

3. Apparatus according to claim 1, wherein the path controller comprises a piezo-electric controller.

4. Surface characteristic determining apparatus for determining a characteristic of a sample surface, the apparatus comprising:

a first light source to provide light of one of a plurality of first wavelengths;

a second light source to provide light of a second wavelength;

a combiner to combine light from the first and second light sources to produce combined light;

a director to direct combined light along a reference path towards a reference surface and along a measurement path towards a sample surface such that light reflected by the sample surface and light reflected by the reference surface interfere to provide interference light, a first detector to detect interference light of the first wavelength;

a second detector to detect interference light of the second wavelength;

an electro-optic modulator to control the relative lengths of the reference and measurement paths on the basis of interference light detected by the second detector;

a determiner to determine a characteristic of a sample surface on the basis of interference light detected by the first detector; and a light source controller to change the wavelength of the first light source to change the location of the sample surface on which light from the first light source is incident to enable the surface characteristic to be determined for different sample surface locations.

5. Surface characteristic determining apparatus for determining a characteristic of a sample surface, the apparatus comprising:

a first light source to provide light of a first wavelength, wherein the first light source comprises a source of coherent light;

a director to direct light along a reference path towards a reference surface and along a measurement path towards a sample surface such that light reflected by the sample surface and light reflected by the reference surface interfere to provide interference light, a first detector to detect interference light of the first wavelength;

a determiner to determine a characteristic of a sample surface on the basis of interference light detected by the first detector;

a second light source to provide light of a second wavelength, wherein the second light source comprises a source of coherent light;

a combiner to combine light from the first and second light sources to produce combined light to cause the director to direct combined light along the reference and sample paths;

a second detector to detect interference light of the second wavelength; and a path length controller to control the relative lengths of the reference and measurement paths on the basis of interference light detected by the second detector; and wherein the measurement path includes an acousto-optical element to control the location of the sample surface on which light from the first light source is incident to enable the surface characteristic to be determined for different sample surface locations.

6. Apparatus according to claim 5, wherein the acoustic optical element is configured to provide an acoustic diffraction grating having a controllable pitch to diffract light on the measurement path to a location of the sample surface determined by the pitch of the acoustic diffraction grating.

7. Apparatus according to claim 5, wherein the acoustic optical element is configured to provide an acoustic diffraction grating having a pitch controlled by a frequency of an applied signal, the acoustic diffraction grating being arranged to diffract light on the measurement path to a location of the sample surface determined by the pitch of the acoustic diffraction grating.

8. Apparatus according to claim 4, wherein the director comprises an optical coupler.

9. Apparatus according to claim 1, wherein the combiner comprises an optical coupler.

10. Apparatus according to claim 1, wherein at least one optical circulator is provided to supply combined light from the combiner towards the director and to supply interference light to the first and second detectors.

11. Apparatus according to claim 1, wherein at least one of the first and second detectors is provided with a filter to enable only light of the first or second wavelength to be incident on that detector.

12. Apparatus according to claim 1, wherein first and second optical circulators are provided to supply combined light towards the director and to supply interference light to the first and second detectors, the first optical circulator having first port to receive combined light, a second port to supply combined light to the director and a third port to supply interference light to a first port of the second optical circulator, the second optical circulator having a second port to supply interference light to one of the first and second detectors via a reflector that reflects light of one of the first and second wavelengths and a third port to supply light reflected by the reflector to the other of the first and second detectors.

13. Apparatus according to claim 12, wherein the reflector comprises a fibre Bragg grating.

14. Apparatus according to claim 1, wherein the director is provided as an optical probe separable from other optical components of the apparatus.

15. Apparatus according to claim 14, wherein the director is coupled to the other optical components by an optical fibre coupling enabling remote location of the optical probe.

16. Apparatus according to claim 14, wherein an optical switch is provided to enable a plurality of optical probes to be coupled to the apparatus.

17. Apparatus according to claim 14, wherein a fibre switch is provided to enable a plurality of optical probes to be coupled to the apparatus.

18. Apparatus according to claim 1, wherein the apparatus is configured as two interferometers having the first and second light sources, respectively and sharing at least parts of their measurement and reference paths.

19. Apparatus according to claim 18, wherein the two interferometers comprise fibre interferometers.

20. Apparatus according to claim 18, wherein the two interferometers comprise Michelson interferometers.

21. Apparatus according to claim 1, wherein the determiner is operable to use phase shifting interferometer to determine a characteristic of a sample surface on the basis of interference light detected by the first detector at a plurality of different phase positions.

22. Apparatus according to claim 1, wherein at least part of an optical system of apparatus is integrated as a single device.

23. Apparatus according to claim 1, wherein the other optical components are integrated as a single device.

24. Apparatus according to claim 23, wherein the optical probe is mounted to a waveguide channel of the single integrated device.

25. Apparatus according to claim 22, wherein the integrated device comprises a silica-on-silicon integrated device.

* * * * *